(12) United States Patent
Pinter

(10) Patent No.: US 10,684,173 B2
(45) Date of Patent: Jun. 16, 2020

(54) INTERACTIVE ARTISTIC PRESENTATION SYSTEM WITH THERMOGRAPHIC IMAGERY

(71) Applicant: Marco Pinter, Santa Barbara, CA (US)

(72) Inventor: Marco Pinter, Santa Barbara, CA (US)

(*) Notice: Subject to any disclaimer, the term of this patent is extended or adjusted under 35 U.S.C. 154(b) by 0 days.

(21) Appl. No.: 16/601,537

(22) Filed: Oct. 14, 2019

(65) Prior Publication Data
US 2020/0056944 A1 Feb. 20, 2020

Related U.S. Application Data

(63) Continuation-in-part of application No. 15/498,347, filed on Apr. 26, 2017, now Pat. No. 10,447,946.

(51) Int. Cl.
*G01J 5/00* (2006.01)
*G01J 5/02* (2006.01)
(Continued)

(52) U.S. Cl.
CPC ............ *G01J 5/0025* (2013.01); *A63J 5/021* (2013.01); *G01J 5/0205* (2013.01); *G01J 5/505* (2013.01);
(Continued)

(58) Field of Classification Search
CPC .................. G01J 5/0022; G01J 5/0025; G01J 2005/0077; G01J 2005/0081;
(Continued)

(56) References Cited

U.S. PATENT DOCUMENTS

| 7,693,679 B1 | 4/2010 | Warnke et al. |
| 8,035,612 B2 | 10/2011 | Bell et al. |

(Continued)

FOREIGN PATENT DOCUMENTS

| JP | 2014157316 A | 8/2014 |
| WO | 2009016624 A2 | 2/2009 |

(Continued)

OTHER PUBLICATIONS

Iwai et al.; "ThermoPainter: A Tablet Type Input Device Using Thermal Images and Its Interactive Drawing System"; Journal of Information Processing Society of Japan; vol. 46, Issue 7; 2005 (Year: 2005).*

(Continued)

*Primary Examiner* — John Villecco

(57) ABSTRACT

Disclosed is an interactive thermographic presentation system and associated methods. The exemplary thermographic presentation system captures residual heat from human touch and/or breath on a surface over time and generates a visual representation of the captured heat pattern. The visual representation may be generated in real time using a visual light projector or stored for subsequent presentation, which may include generating a physical print of the visual representation. In one embodiment the system may be deployed as an art or science exhibit. In general, the system may be deployed in any setting in which individuals gather, including, but not limited to, art galleries, schools, science fairs, trade shows, music venues, dance clubs, restaurants, homes, and public spaces.

18 Claims, 3 Drawing Sheets

(51) Int. Cl.
*G01J 5/50* (2006.01)
*G03B 21/56* (2006.01)
*H04N 5/33* (2006.01)
*A63J 5/02* (2006.01)
*A63J 7/00* (2006.01)

(52) U.S. Cl.
CPC ............... *G03B 21/56* (2013.01); *H04N 5/33* (2013.01); *A63J 7/00* (2013.01); *G01J 2005/0077* (2013.01); *G01J 2005/0081* (2013.01)

(58) Field of Classification Search
CPC ......... G01J 5/0505; H04N 5/33; G03B 21/56; A63J 5/021; A63J 7/00
USPC .................................................. 348/164, 165
See application file for complete search history.

(56) References Cited

U.S. PATENT DOCUMENTS

| | | |
|---|---|---|
| 8,035,624 B2 | 10/2011 | Bell et al. |
| 8,432,433 B2 | 4/2013 | Gabura |
| 8,867,835 B2 | 10/2014 | Flagg et al. |
| 9,109,945 B1 | 8/2015 | Warnke et al. |
| 9,232,142 B2 | 1/2016 | McManus et al. |
| 2005/0162381 A1 | 7/2005 | Bell et al. |
| 2006/0126085 A1* | 6/2006 | Owen ............... H04N 1/465 358/1.9 |
| 2006/0187544 A1* | 8/2006 | Wiener .............. G03B 21/58 359/443 |
| 2008/0062123 A1* | 3/2008 | Bell .................. G06F 3/011 345/156 |
| 2008/0150913 A1 | 6/2008 | Bell et al. |
| 2010/0238544 A1* | 9/2010 | Elliott .............. G03B 21/58 359/443 |
| 2011/0084903 A1* | 4/2011 | Onishi .............. G01J 1/02 345/157 |
| 2011/0091102 A1 | 4/2011 | Cimbalista |
| 2011/0299826 A1* | 12/2011 | Weisbach ........... H04N 5/243 386/227 |
| 2012/0281098 A1 | 11/2012 | Wagner |
| 2013/0048855 A1 | 2/2013 | Abreo |
| 2014/0368641 A1 | 12/2014 | Strandemar et al. |
| 2015/0124102 A1 | 5/2015 | Frost |
| 2015/0234454 A1 | 8/2015 | Kurz |
| 2015/0261383 A1 | 8/2015 | Lee et al. |
| 2016/0077668 A1 | 3/2016 | Schultz |
| 2017/0075502 A1 | 3/2017 | Kurz |
| 2017/0287172 A1* | 10/2017 | Sykes .................. G06F 3/048 |
| 2018/0052057 A1 | 2/2018 | Richards et al. |
| 2019/0049834 A1* | 2/2019 | Mathieson ........... G03B 21/56 |

FOREIGN PATENT DOCUMENTS

| | | |
|---|---|---|
| WO | 2015081167 A1 | 6/2015 |
| WO | 2015120913 A1 | 8/2015 |

OTHER PUBLICATIONS

Iwai, Daisuke, et al., "Heat Sensation in Image Creation with Thermal Vision", Proceedings of the 2005 ACM SIGCHI International Conference on Advances in computer entertainment technology, pp. 213-216, ACM, 2005.
Shirazi, Alireza Sahami, et al., "Exploting Thermal Reflection for Interactive Systems", Proceedings of the SIGCHI Conference on Human Factors in Computing Systems, pp. 3483-3492, ACM, 2014.
Larson, Eric, et al., "HeatWave: Thermal Imaging for Surface User Interaction", Proceedings of the SIGCHI Conference on Human Factors in Computing Systems, pp. 2565-2574, ACM, 2011.
Palmerius, Karljohan Lundin, et al., "Visualization of Heat Transfer using Projector-based Spatial Augmented Reality", Augmented Reality, Virtual Reality, and Computer Graphics; Lecture Notes in Computer Science, vol. 9768, Springer, Cham 2016.
Gladyszewski, Stephane, "Live thermal video projection system", www.vimeo.com/60292952,Vimeo.com, 2013.
SENSlab; "ThermoPainter"; YouTube video <https://www.youtube.com/watch?v=ZFjclf7DXmA>; Feb. 18, 2010 (Year: 2010).

* cited by examiner

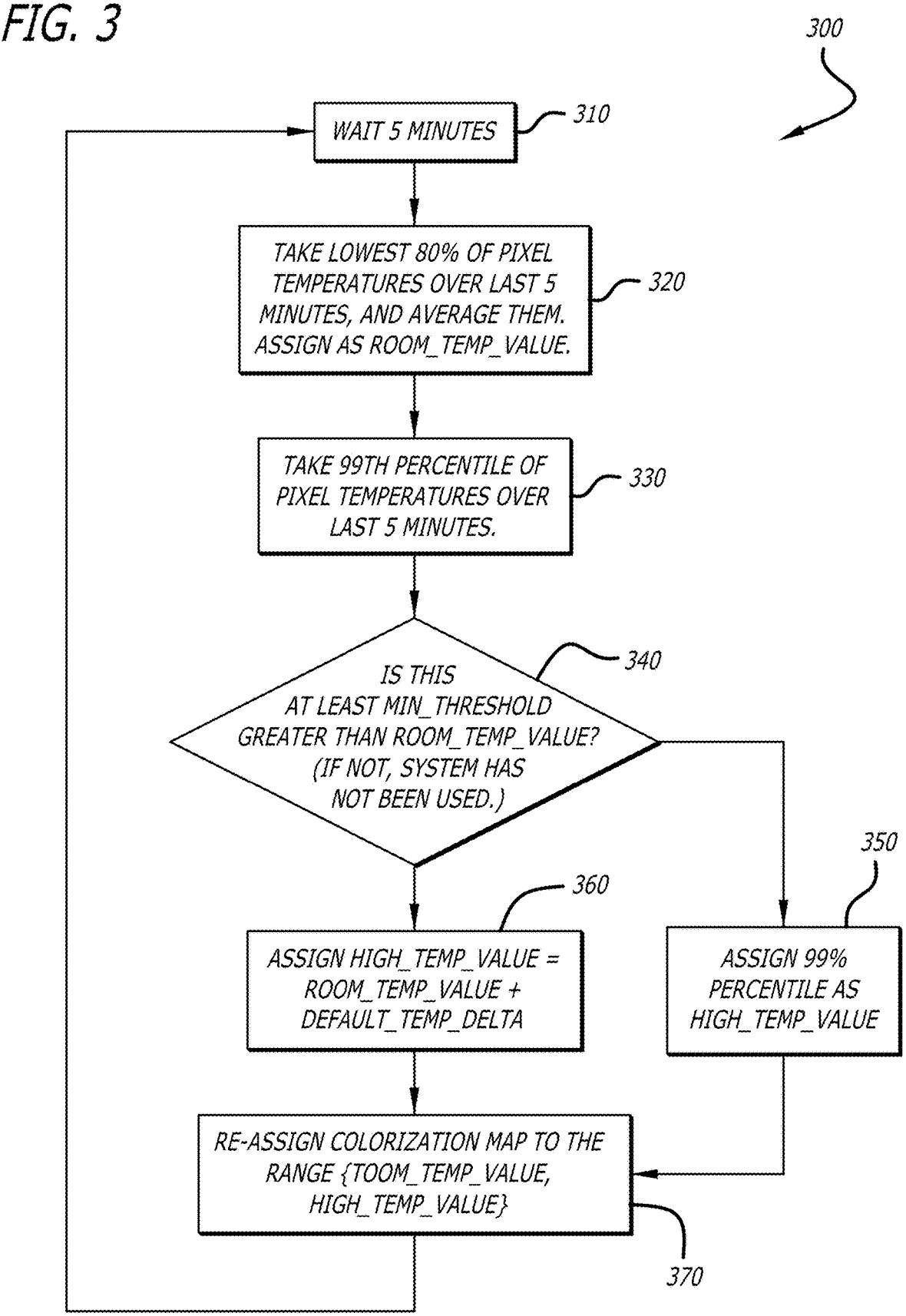

INTERACTIVE ARTISTIC PRESENTATION SYSTEM WITH THERMOGRAPHIC IMAGERY

BACKGROUND

Thermal imaging devices, or thermal cameras, are known in the art and are useful for capturing and visualizing temperature differences in an environment within the field of view of the camera. Not long ago, quality thermal cameras were expensive and their use was generally confined to military, manufacturing, and scientific applications. However, quality, affordable, consumer-grade thermal cameras are now becoming more readily available, including thermal cameras that output live thermal video in real time. With that trend, thermal cameras are becoming ever more available to independent inventors, hobbyists, and artists, greatly expanding their potential uses and applications.

SUMMARY

Thermal cameras create new opportunities for visual and performing artists in providing a tool for characterizing an environment in terms of the temperature of objects within it in real time. The flow of heat energy from one object to another within a dynamic environment is generally not perceptible to human vision. Thus, thermal cameras provide a way to reveal a subtle physical relationship among entities, especially a warm body, in a dynamic environment. Thermal cameras present an opportunity to call attention to this relationship and portray it in interesting and engaging ways.

One aspect of the disclosure is an interactive thermographic display system. The system comprises a projection screen, a thermal camera, and a visible light projector. The thermal camera is located on a first side of the screen and captures live thermal video of the first side of the screen. The visible light projector is in communication with the thermal camera and also located on the first side of the screen. The visible light projector projects a visible light representation of the live thermal video onto the first side of the screen in real time, wherein the visible light representation is visible on a second side of the screen. When a person, or other warm body, comes into contact with the second side of the screen, the person's body heat warms the screen where it was touched. The warmth is detected by the thermal camera and a visible light representation of the heat energy in the screen is then projected back onto the screen. Thus, the user can visualize, on the screen, where their body heat has warmed the screen, even after they have stopped touching the screen. Since the display is in real-time, the illumination of the screen where it was touch gradually fades away as the portion of the screen that was touched returns to room temperature. In this way, the user can "paint" on the screen in real time by moving their hands or other parts of their body around on the screen.

Another aspect of the disclosure is a method for an interactive thermographic display system. The method includes a step capturing live thermal video of a first side of a projection screen using a thermal camera located on the first side of the projection screen. Once the live thermal video is captured, the method includes a step of generating a visible light representation of the live thermal video. Finally, the method may include the step of projecting the visible light representation of the live thermal video onto the first side of the projection screen using a visible light projector located on the first side of the projection screen, wherein the visible light representation is visible on a second side of the projection screen.

Yet another aspect of the disclosure is an interactive thermographic printing system. The system includes a screen and a thermal camera that is located on a first side of the screen and captures live thermal video of the first side of the screen. The system also includes a processor in communication with the thermal camera. The processor performs a colorization operation on the live thermal video. The system includes a storage device in communication with the processor. The storage devices receives and stores the colorized live thermal video. Finally, the system includes a printer. The printer prints an image of the stored video.

BRIEF DESCRIPTION OF THE DRAWINGS

FIG. 3 is a flow chart illustrating an exemplary process for automatically recalibrating the temperature-color mapping.

DETAILED DESCRIPTION

The following is a description of an exemplary embodiment of an interactive thermographic presentation system and associated methods. The exemplary thermographic presentation system captures residual heat from human touch and/or breath on a surface over time and generates a visual representation of the captured heat pattern. The visual representation may be generated in real time using a visual light projector or stored for subsequent presentation, which may include generating a physical print of the visual representation.

In one embodiment the system may be deployed as an art or science exhibit. In general, the system may be deployed in any setting in which individuals gather, including, but not limited to, art galleries, schools, science fairs, trade shows, music venues, dance clubs, restaurants, homes, and public spaces.

Figure 1:
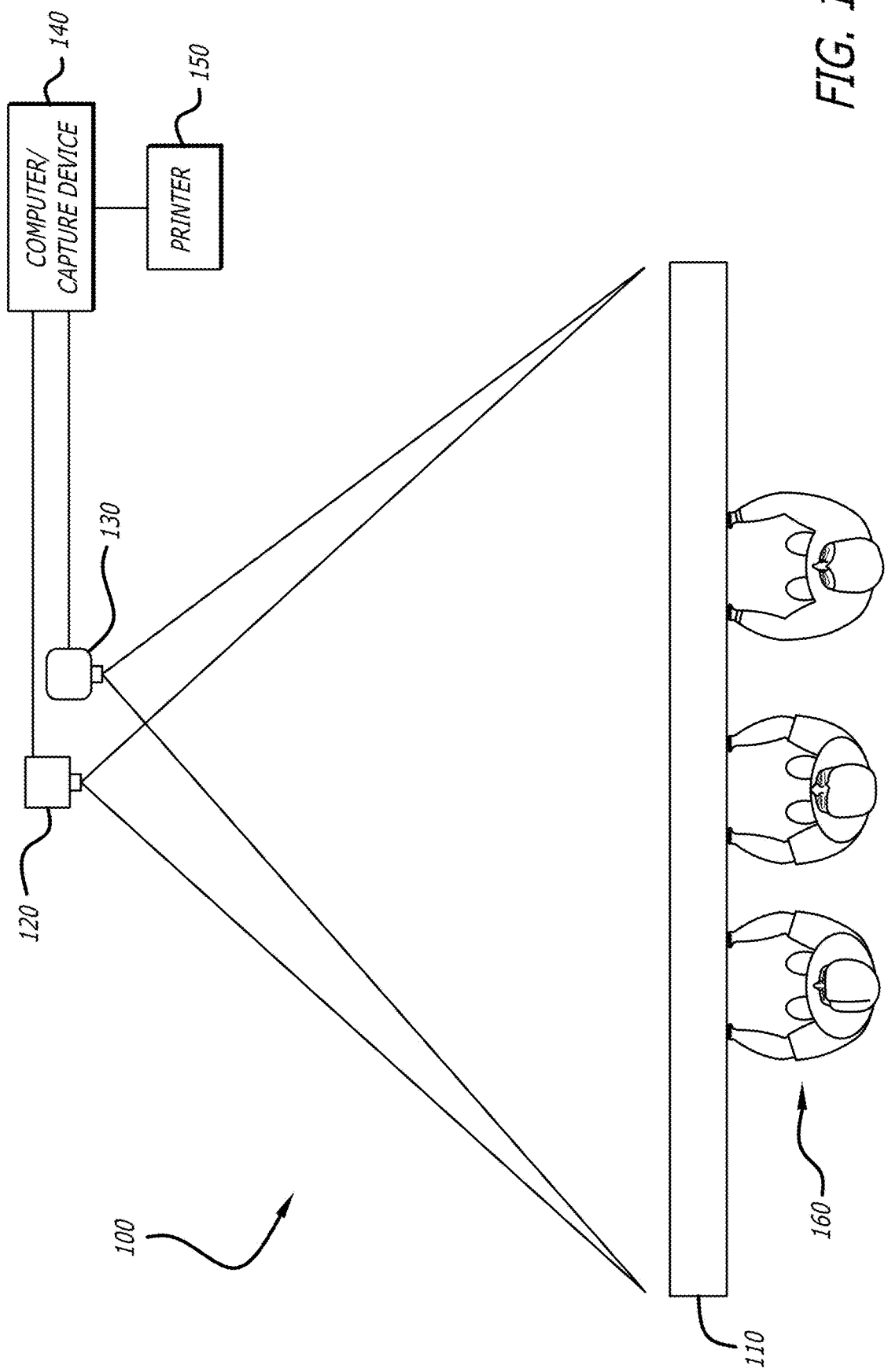
FIG. 1 is a diagram of an exemplary interactive thermographic display system in accordance with the disclosure.

Referring to the drawings more particularly to the drawings by reference number, FIG. 1 illustrates an exemplary embodiment of an interactive thermographic presentation system 100. The system 100 may include a projection screen 110, a thermal camera 120, and a visible light projector 130. The screen 110 may take the form of four-way stretched elastic fabric formed of woven copolymer fibers, such as that marketed under the tradename LYCRA, or another similar material. The screen may measure approximately 8 feet wide by 6 feet high, although the dimensions of the screen 110 may be made larger or smaller to suit the environment and/or application. The fabric serves as both a rear projection surface and an elastic, tactile interface that users can push and deform with their bodies, appendages, or other instruments. The fabric is elastic and thus returns to at flat surface (or its original form) when the user disengages with or otherwise stops touching the fabric. The fabric may be tightly-woven or otherwise made to be opaque so that it creates a visual barrier that the user cannot see through. An opaque fabric enhances the experience by ensuring that the user cannot see the thermal camera, the visible light projector, and/or undiffused light emanating from the visible light projector behind the screen. Similarly, an opaque fabric enhances the experience by creating a thermal barrier that limits the thermal camera's ability to detect heat sources that are behind the fabric. In this way, the fabric serves to isolate or highlight heat sources that are near or touching the fabric by obscuring or filtering out heat sources positioned further behind the fabric. Thus, the fabric is distinct from substantially transparent, open-mesh knit fabrics such as those used to form stage scrims, mosquito netting, or similar, which are permeable or "see through"—allowing viewing on both sides depending on lighting—and neither elastic nor deformable.

The screen 110 may be supported by a frame (not shown) that may be made of aluminum or any other suitable material, including wood, plastic, or other metals. In general, the screen 110 may be composed of any material that allows (1) heat from user contact on one side of the screen 110 to be detected by the thermal camera 120 on the opposite side of the screen 110 and (2) visible light projected onto one side of the screen 110 to be perceptible to humans on the opposite side of the screen 110.

The thermal camera 120 may be positioned on a first side of the screen 110 and configured to capture live thermal video of the first side of the screen 110. The thermal camera 120 can be one of many commercially available cameras such as the FLIR BOSON 320×256 pixel 50-degree camera. The thermal data captured by the camera 120 may be represented as 14-bit integers, one per each pixel. Depending on the radiometric capabilities of the camera 120, the integers may represent exact temperature values or relative temperatures. For the purpose of this system, exact temperature values are unimportant. The camera 120 outputs live thermal video and is coupled to a computer/capture device 140 using a USB-C cable or any other suitable interface, including HDMI, etc. The image values of the live thermal video are then colorized on the computer 140 into one of a variety of thermal color palettes. A common thermal color palette is known as "IronBow", but many palettes exist, and new palettes may be created to allow for interesting aesthetics.

The visible light projector 130 projects a mirror image of the colorized version of the live thermal video back onto the rear, or second side, of the screen 110. In this fashion, the screen 110 acts as a rear projection screen, and the colorized live thermal video can be seen by the one or more users 160 on the first side of the screen 110.

In general, colorization involves applying a color mapping or transformation to the live thermal video received from the thermal camera 120. The color mapping may map temperature values in the live thermal video to various colors in the visible light spectrum. The mapping may be calibrated so as to map all or a subset of colors in the visible light spectrum to a range of temperature values having an upper bound at or near the surface temperature of the user's skin and a lower bound below the user's skin temperature but above the ambient environmental temperature. This ensures that a spectrum of colors is presented as the residual heat from the user's contact on the screen 110 decays over time.

In one embodiment, colorization is accomplished by first specifying a range of temperatures [low_temp, high_temp], mapping all heat values less than or equal to low_temp to the first color in the palette, mapping all heat values greater than or equal to high_temp to the last color in the palette, and interpolating all heat values between low_temp and high_temp to their closest matching color index in the palette range.

Figure 2A:
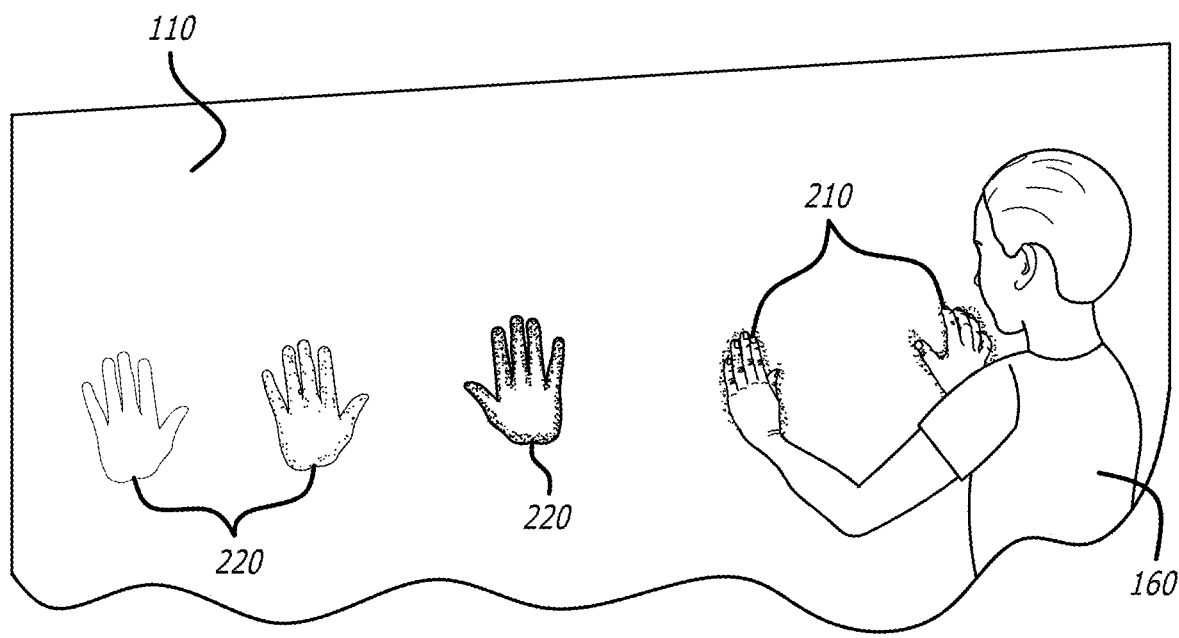
FIG. 2A is a view of the exemplary interactive display system in use.
Figure 2B:
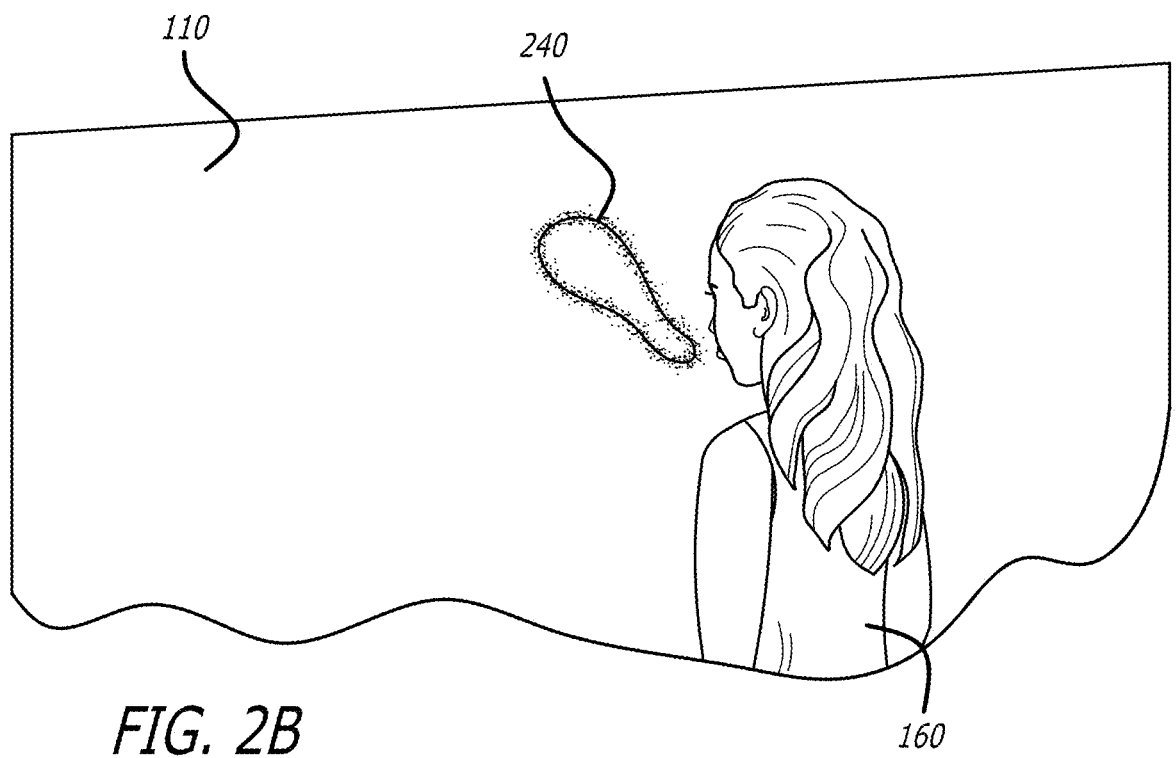
FIG. 2B is another view of the exemplary interactive display system in use.

The screen 110 material, whether lycra or some other material, holds heat for a period of time and dissipates it. The system 100 allows users 160 to see heat of their bodies and breath in real time, at the location they are touching, and allows them to visualize a history of their interaction, as the heat slowly dissipates. Dissipating hand prints 220 are exemplified in FIG. 2A, and dissipating breath 240 is exemplified in FIG. 2B.

In order to precisely align the projection with the thermal capture image, the projector output may need to be keystoned both vertically and horizontally, either on the projector 130 itself, or within keystoning software on the computer 140. A manual process of calibration involves touching one's hand at the four corners of the screen 110 and adjusting keystoning until the projected hands touch the corners. In one embodiment, the system 100 can be calibrated so that the projected image is an inch above the actual heat source, in order to allow users 160 to better see their heat signatures as they interact with the system 100.

In certain embodiments, the thermal camera 120 includes computing and colorization circuitry and outputs a video signal, and as such can be directly connected to the projector 130 for live re-projection. In this embodiment, the computer 140 is effectively embedded within the thermal camera 120.

In other embodiments, the thermal camera 120 outputs an analog grayscale image that is digitized and input into the computer 140. In this embodiment, the algorithm first converts the grayscale image to an 8-bit heat scale, and then proceeds with the colorization algorithm.

In some embodiments, the screen 110 may be tilted at an angle whereby the top of the screen 110 hangs over at a 10-degree to 45-degree angle, and the camera 120 and projector 130 are mounted at a corresponding height. From the point of view of the user, who is positioned on the opposite side of the screen than the thermal camera and projector, the top of the screen hangs over the bottom of the screen, and thus the screen is tilted to form an acute angle between the ground and the side of the projection screen where the viewer stands and sees the representation. This embodiment allows users 160 to press their bodies into the fabric without the danger of tripping and falling over.

The system 100 may use a single thermal color palette. Alternatively, multiple color palettes may be used, and the computer 140 may switch colorization palettes over time. Switching may happen on a timer, or when it is detected that there is no one interacting with the system 100 (based on all colors being below a certain threshold), or based on coupling with a physical button in the room, or based on wireless selection from a mobile app.

The system 100 is designed to be used in varying environmental conditions. It may be used outside, where temperatures vary throughout the day and evening, or inside, where temperatures vary based on the HVAC system. Without compensating for these temperature changes, the aesthetics of the interactive display may suffer, because the range of actual temperatures present on the screen 110 may not correspond closely to the low_temp and high_temp values used by the colorization algorithm. Thus, it may be beneficial to have a software routine or process executing on computer 140 that periodically adjusts for these changes, and is also robust to whether users 160 are interacting with the system 100 or not.

FIG. 3 is a flow chart of an exemplary software routine or process 300 that can be used to automatically recalibrate the color mapping to account for ambient temperature changes. At step 310, pixel temperatures are aggregated over a specified period of time, e.g., 5 minutes. Although 5 minutes is used in this example, the specified time period may be longer or shorter to optimize the recalibration process to different circumstances. These circumstances may include unstable or rapidly changing ambient environmental conditions, frequency of user interaction with the system, and/or duration of sustained user interaction with the system. At step 320, the lowest 80% of the temperature values aggregated in step 310 are then averaged, and that value is used as a new ROOM_TEMP_VALUE (which is assigned to low_temp). Although a lower threshold of 80% of temperature values is used in this example, it is to be appreciated that other thresholds could be used to optimize the recalibration process to different circumstances.

At step 330, the process obtains the $99^{th}$ percentile of the temperature values aggregated in step 310. At step 340, the $99^{th}$ percentile of temperature values sampled in step 330 is compared to ROOM_TEMP_VALUE and a determination is made as to whether the $99^{th}$ percentile temperature value sampled in step 330 is less than ROOM_TEMP_VALUE plus a predetermined minimum threshold. The predetermined minimum threshold may be, for example, the equivalent of 10 degrees Fahrenheit, or it may be characterized in terms of a percentage of the ROOM_TEMP_VALUE (e.g, 10%, 15%, 20%, etc.). This percentage may be chosen to optimize the recalibration process to different circumstances. If it is determined in step 340 that the $99^{th}$ percentile temperature value is less than ROOM_TEMP_VALUE plus the predetermined minimum threshold, then it can be assumed that the system has not been interacted with in the last 5 minutes. In that case, the process proceeds to step 360.

At step 360, a HIGH_TEMP_VALUE is assigned to be ROOM_TEMP_VALUE plus a pre-determined DEFAULT_TEMP_DELTA. The DEFAULT_TEMP_DELTA may be the equivalent of 25 degrees Fahrenheit, a threshold dependent on the ROOM_TEMP_VALUE, determined via a lookup table, or a percentage of the ROOM_TEMP_VALUE.

Otherwise, if it is determined in step 340 that the $99^{th}$ percentile is greater than ROOM_TEMP_VALUE plus the predetermined minimum threshold, it can be assumed the system has been interacted with in the past five minutes, and the process proceeds to step 350. At step 350, a HIGH_TEMP_VALUE is assigned the $99^{th}$ percentile value sampled in step 330. The ROOM_TEMP_VALUE and HIGH_TEMP_VALUE may be used to define the bounds of the temperature range [low_temp, high_temp] referred to above with respect to the colorization process. In this fashion, the colorization process will always be using a range that goes from approximate room temperature to the highest temperature set by any user, with some margin for error. Although a $99^{th}$ percentile threshold is used in this example, it is to be appreciated that a different threshold could be used to optimize the recalibration process to different circumstances.

In an alternate embodiment, the system 100 illustrated in FIG. 1 may be used to create artistic thermal prints of dancer interaction. In this embodiment, dancers act as the users 160, pressing their limbs and bodies against the screen 110, and using their breath on the screen 110. In this embodiment, the projector 130 is optional and may not be used, since the desired outcome is an image for printing. In one version, a printer 150 may be connected to the computer 140 and allow live printing of colorized images. In a more common version, the computer 140 stores images and image sequences from a live session with dancers. The images are stored on a storage medium in their raw format, with integers for each pixel representing heat level. At some later time, on the same computer 140 or a different computer, the raw images are converted to colorized images using one of a variety of thermal palettes. The palettes used in this embodiment are chosen such that every color is "in gamut" for standard color printers, to ensure that images will print well. Finally, the colorized image may be sent to a printer 150 that is connected to the computer 140 or sent to a printing service for offline printing onto one of a variety of media, including paper, acrylic, canvas or aluminum.

Aspects of this disclosure may be embodied as a system, a method, and/or a computer program product. The computer program product may include a computer readable storage medium (or media) having computer readable program instructions thereon for causing a processor to carry out aspects of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described in this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

I claim:

1. An interactive thermographic display system, comprising:
    a projection screen that has a first side and a second side, the projection screen including an opaque four-way stretched elastic fabric;
    a thermal camera that is located on the first side of the screen and captures live thermal video of the first side of the screen;
    a processor in communication with the thermal camera, the processor generates colorized live thermal video by performing a colorization operation on the live thermal video; and,
    a visible light projector in communication with the processor and located on the first side of the screen, the visible light projector projects a visible light representation of the colorized live thermal video onto the first side of the screen in real time such that the visible light representation of a heat signature on the projection screen changes in real time as the heat signature dissipates over time, wherein the visible light representation is visible on the second side of the screen wherein the colorization operation performed by the processor includes periodically switching from a first color palette to a second color palette.

2. The system of claim 1, wherein the colorization operation includes mapping a range of temperature values to a first color value.

3. The system of claim 2, wherein the processor periodically adjusts the range of temperature values mapped to the first color value.

4. The system of claim 1, wherein the visible light projector projects the visible light representation by projecting the colorized live thermal video.

5. The system of claim 1, wherein the projection screen has an area of at least sixteen (16) square feet.

6. The system of claim 1, wherein the thermal camera and the projector are both positioned to face the first side of the screen.

7. The system of claim 1, wherein the projection screen is oriented substantially perpendicular to the ground.

8. The system of claim 1, wherein the projection screen is tilted to form an acute angle between the ground and the second side of the projection green.

9. The system of claim 1, wherein the fabric is formed of tightly-woven copolymer fibers.

10. An interactive thermographic display system, comprising:
    a projection screen that has a first side and a second side and is tilted to form an acute angle between the ground and the second side of the projection screen;
    a thermal camera that is located on the first side of the screen and captures live thermal video of the first side of the screen;
    a processor in communication with the thermal camera, the processor generates colorized live thermal video by performing a colorization operation on the live thermal video; and, a visible light projector in communication with the processor and located on the first side of the screen, the visible light projector projects a visible light representation of the colorized live thermal video onto the first side of the screen in real time such that the visible light representation of a heat signature on the projection screen changes in real time as the heat signature dissipates over time, wherein the visible light representation is visible on the second side of the screen.

11. The system of claim 10, wherein the colorization operation includes mapping a range of temperature values to a first color value.

12. The system of claim 11, wherein the processor periodically adjusts the range of temperature values mapped to the first color value.

13. The system of claim 10, wherein the visible light projector projects the visible light representation by projecting the colorized live thermal video.

14. The system of claim 10, wherein the projection screen has an area of at least sixteen (16) square feet.

15. The system of claim 10, wherein the thermal camera and the projector are both positioned to face the first side of the screen.

16. The system of claim 10, wherein the screen includes an opaque four-way stretched elastic fabric, wherein the fabric is formed of tightly-woven copolymer fibers.

17. The system of claim 10, wherein the colorization operation performed by the processor includes periodically switching from a first color palette to a second color palette.

18. An interactive thermographic display system, comprising:
a projection screen that has a first side and a second side and is tilted to form an acute angle between the ground and the second side of the projection screen, the projection screen includes an opaque four-way stretched elastic fabric;
a thermal camera that is located on the first side of the screen and captures live thermal video of the first side of the screen;
a processor in communication with the thermal camera, the processor generates colorized live thermal video by performing a colorization operation on the live thermal video; and,
a visible light projector in communication with the processor and located on the first side of the screen, the visible light projector projects a visible light representation of the colorized live thermal video onto the first side of the screen in real time such that the visible light representation of a heat signature on the projection screen changes in real time as the heat signature dissipates over time, wherein the visible light representation is visible on the second side of the screen.

\* \* \* \* \*